(12) United States Patent
Shinomiya et al.

(10) Patent No.: US 8,264,399 B2
(45) Date of Patent: Sep. 11, 2012

(54) RADAR DEVICE

(75) Inventors: Tomohiro Shinomiya, Kobe (JP); Yasuhiro Kurono, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 235 days.

(21) Appl. No.: 12/872,718

(22) Filed: Aug. 31, 2010

(65) Prior Publication Data

US 2011/0057831 A1 Mar. 10, 2011

(30) Foreign Application Priority Data

Sep. 10, 2009 (JP) ................................. 2009-209597

(51) Int. Cl.
*G01S 13/00* (2006.01)
(52) U.S. Cl. .......................... 342/74; 342/25 R; 342/175
(58) Field of Classification Search ................ 342/25 R, 342/74, 175
See application file for complete search history.

(56) References Cited

U.S. PATENT DOCUMENTS

| | | | | |
|---|---|---|---|---|
| 6,304,214 B1 * | 10/2001 | Aiken et al. | ................... | 342/362 |
| 6,658,234 B1 * | 12/2003 | Dogan et al. | .................. | 455/63.1 |
| 7,190,305 B2 * | 3/2007 | Isaji | ................. | 342/70 |
| 7,196,656 B2 * | 3/2007 | Shirakawa | .................... | 342/147 |
| 7,565,172 B2 * | 7/2009 | Yoshida | .................... | 455/562.1 |
| 7,567,201 B2 * | 7/2009 | Miyake | ............................ | 342/70 |
| 7,884,757 B2 * | 2/2011 | Mohamadi et al. | ............ | 342/175 |
| 7,978,120 B2 * | 7/2011 | Longstaff | .......................... | 342/22 |
| 2002/0045432 A1 * | 4/2002 | Yoshida | .................... | 455/276.1 |
| 2002/0135514 A1 * | 9/2002 | Yoshida | .......................... | 342/378 |
| 2010/0204867 A1 * | 8/2010 | Longstaff | ......................... | 701/26 |

FOREIGN PATENT DOCUMENTS

| | | |
|---|---|---|
| JP | A-2001-194454 | 7/2001 |
| JP | A-2002-181930 | 6/2002 |
| JP | A-2004-198312 | 7/2004 |
| JP | B2-3595220 | 12/2004 |
| JP | A-2005-195491 | 7/2005 |
| JP | B2-3678946 | 8/2005 |
| JP | A-2006-091028 | 4/2006 |
| JP | A-2006-098181 | 4/2006 |
| JP | A-2009-162689 | 7/2009 |

OTHER PUBLICATIONS

Y. Miyake at al., "Automotive Radar with High-resolution Algorithm," DENSO Technical Review, vol. 12, No. 1, May 2007, pp. 23-28 (with English abstract).

* cited by examiner

*Primary Examiner* — Jack W Keith
*Assistant Examiner* — Peter Bythrow
(74) *Attorney, Agent, or Firm* — Oliff & Berridge, PLC

(57) ABSTRACT

In a radar device including: a transmission antenna group having a plurality of transmission antennas; a reception antenna group having a plurality of reception antennas; and transmission switchover means to transmit transmission waves in a way that sequentially switches over the transmission antennas of the transmission antenna group, the reception antenna group receiving reflected waves, reflected from a target, of transmission waves of the transmission antennas when sequentially transmitting the transmission waves, is made to function as a virtual sub-array corresponding to the transmission antennas. The target is thus detected by executing a space averaging process based on a relative position, to the reception antenna group, of each of the transmission antennas undergoing the transmission switchover with respect to the virtual correlation values corresponding to the plurality of virtual sub-arrays.

8 Claims, 15 Drawing Sheets

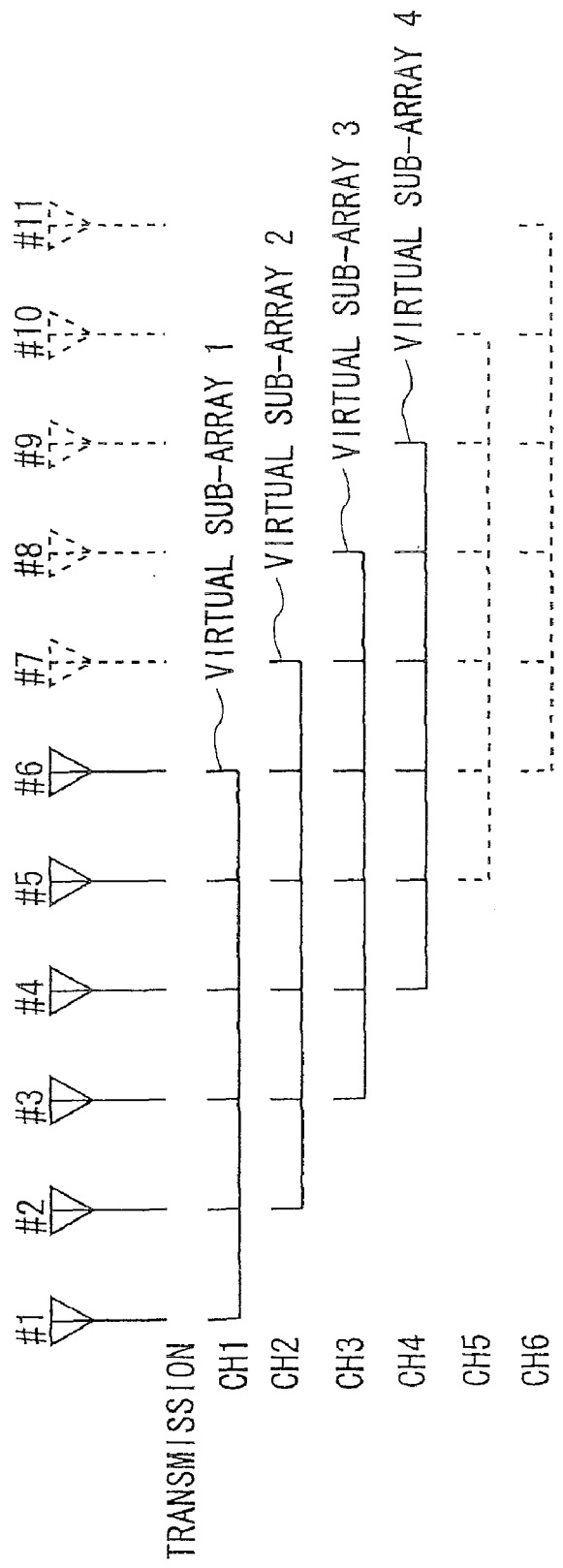

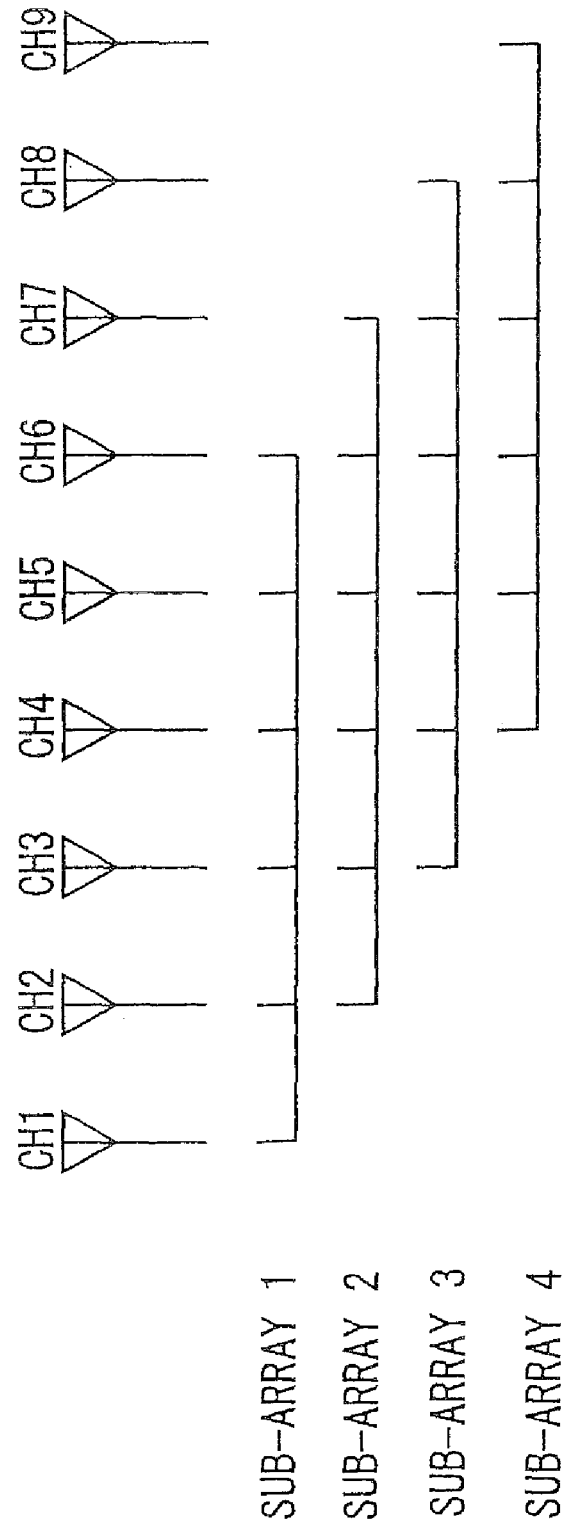

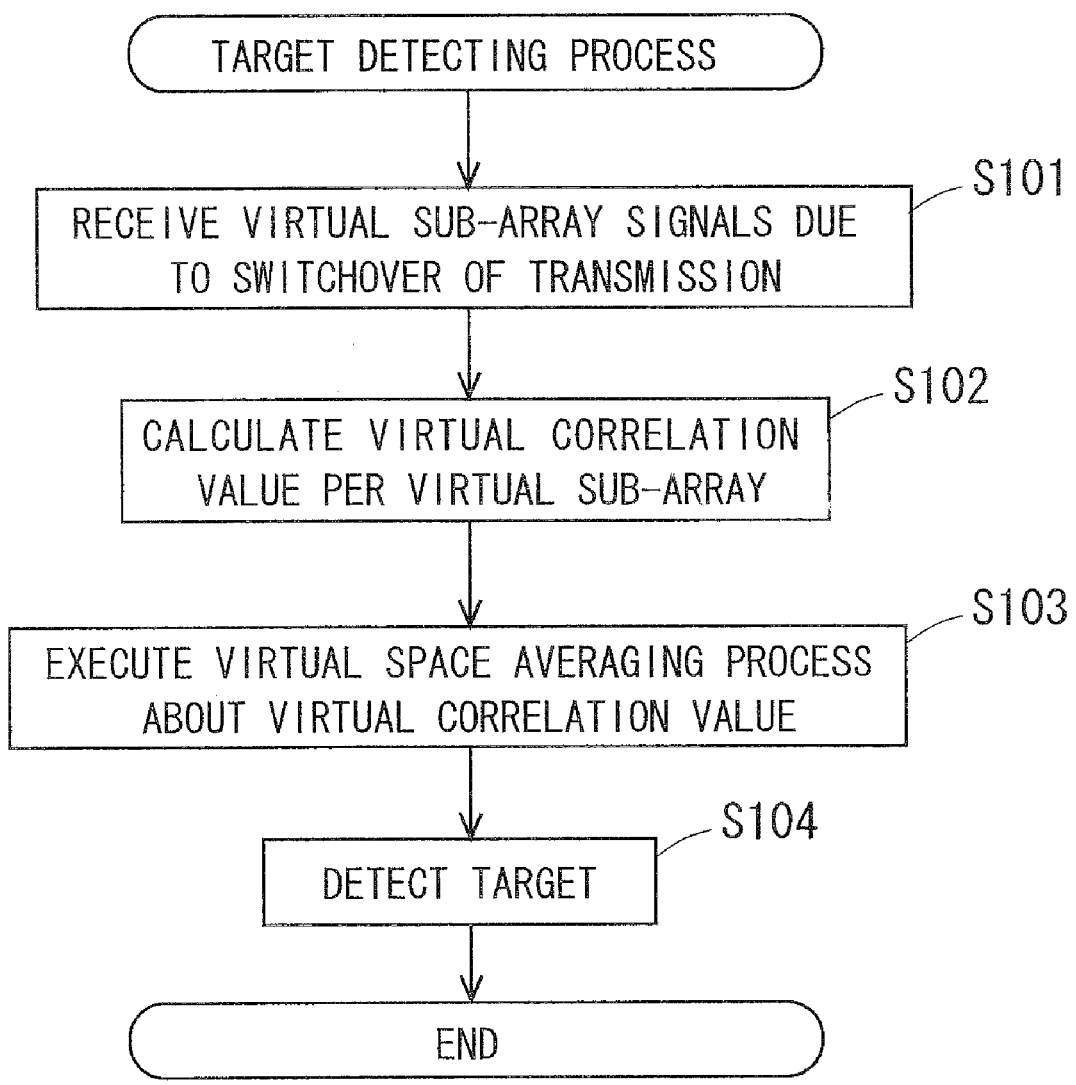

FIG. 5B
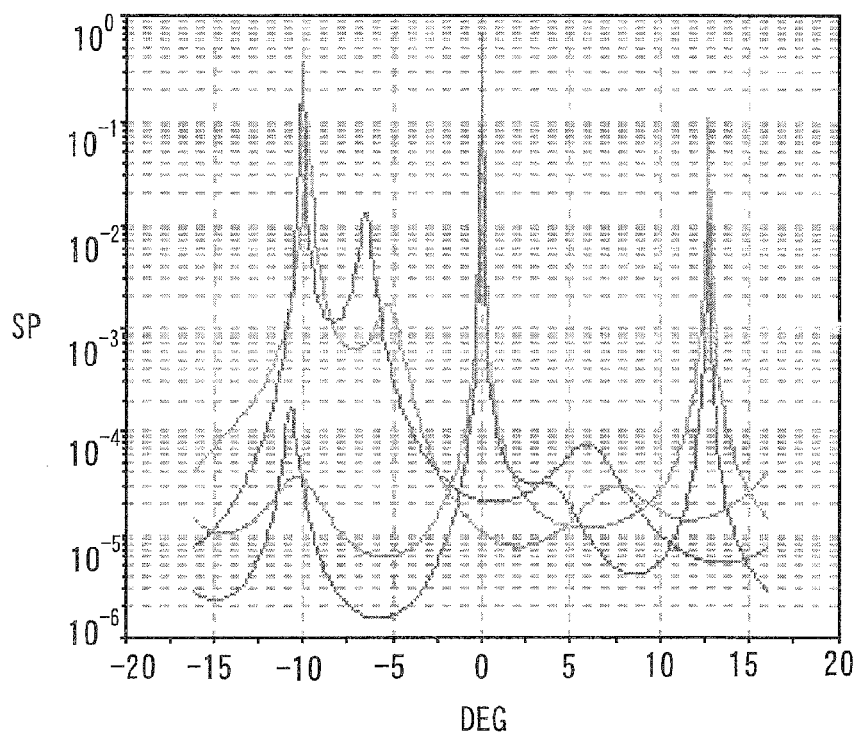
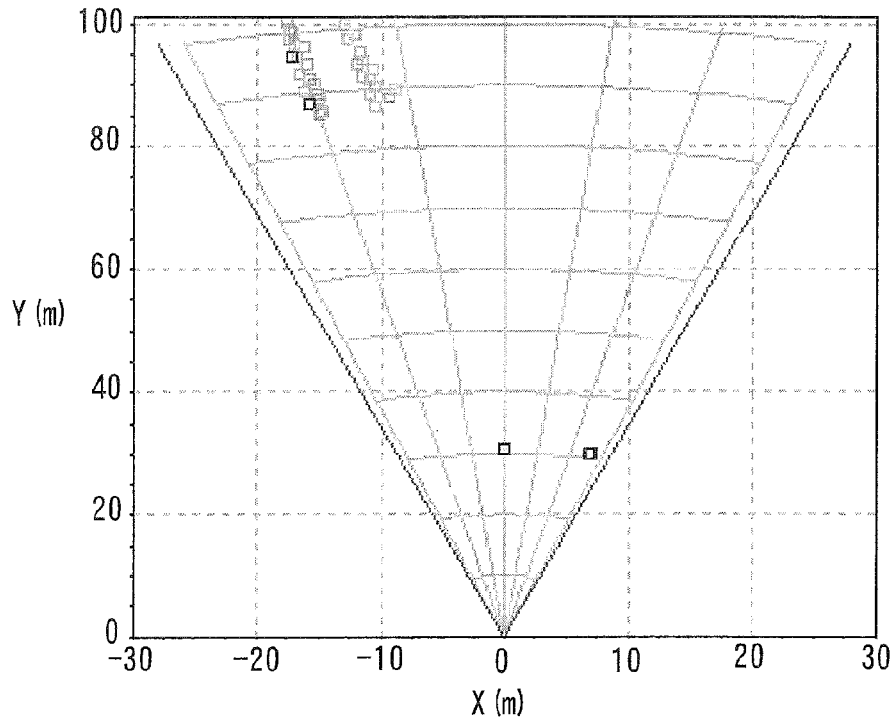

FIG. 5C
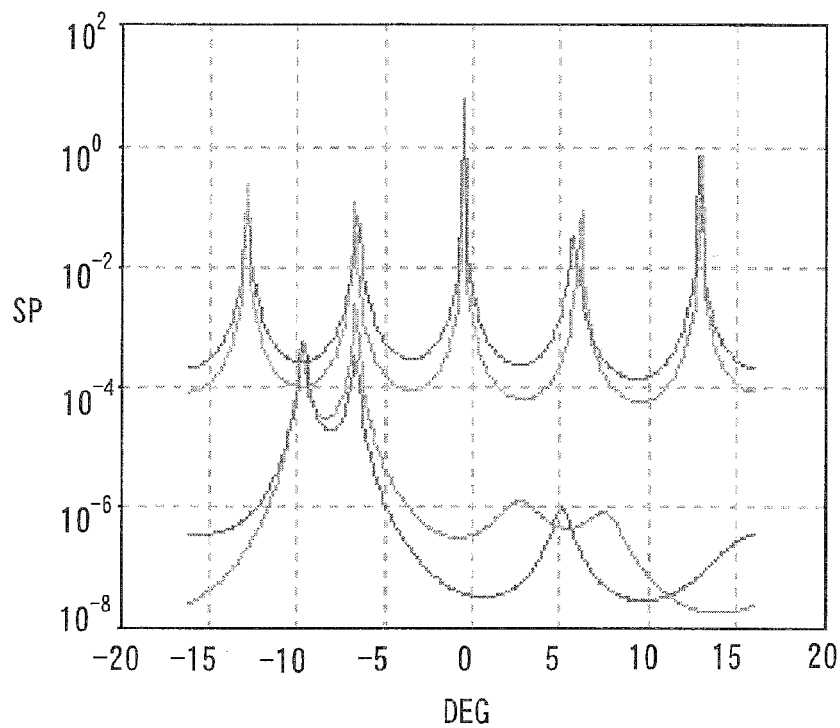
PRISM SPECTRUM 11ANT
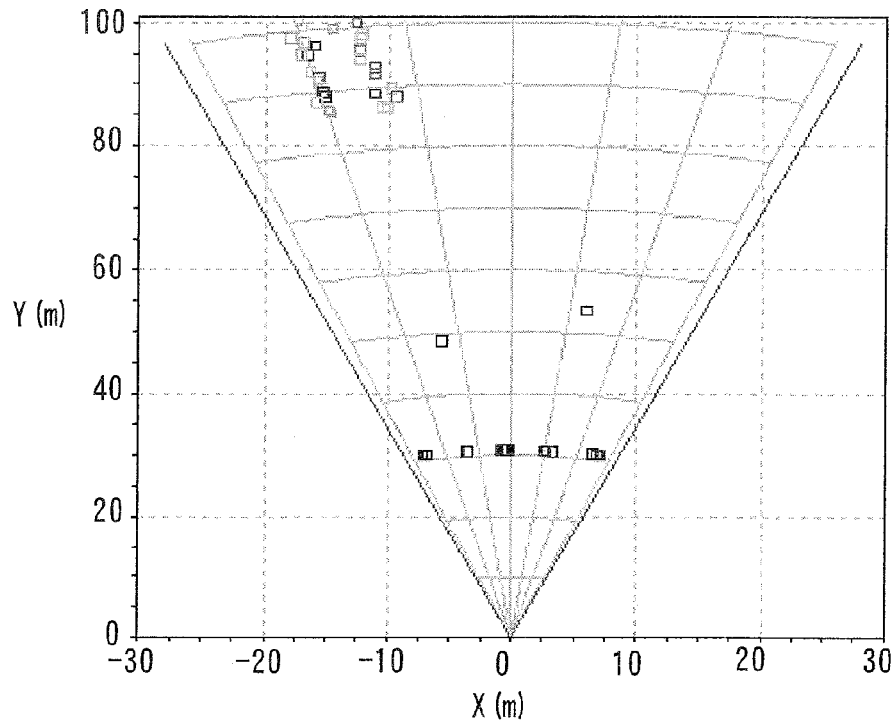
PRISM PAIR 11ANT (19)

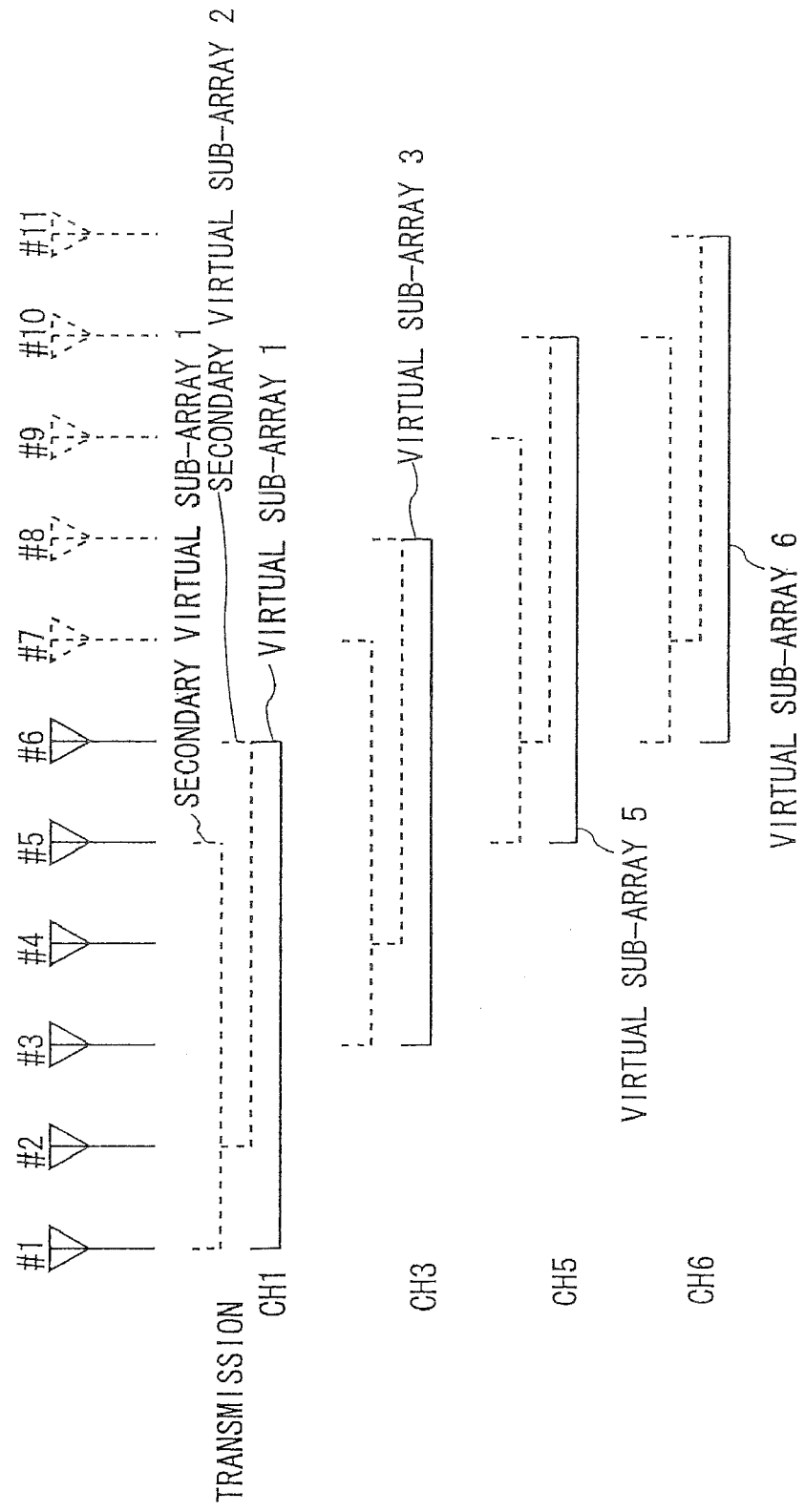

RADAR DEVICE

CROSS-REFERENCE TO RELATED APPLICATIONS

This application is based upon and claims the benefit of priority of the prior Japanese Patent Application No. JP2009-209597, filed on Sep. 10, 2009, the entire contents of which are incorporated herein by reference.

FIELD

The present invention relates to a radar device which detects a target.

BACKGROUND

In a radar device equipped with an array antenna in which antennas are disposed at equal intervals, there has hitherto been a technique of obtaining reception results by use of virtual antennas of which the number exceeds the number of the actual antennas in a way that performs holographic synthesization of transmission/reception results while switching over the antennas used as transmission antennas (refer to, e.g., Patent documents 1 through 4).

Further, in the radar device such as a synthetic aperture radar (SAR) utilizing adaptive antennas, a technique of restraining influence of interference waves having correlativeness with desired waves is exemplified by a processing technique based on a space averaging method (space smoothing method). This space averaging process is a technique of restraining a degree of a cross-correlation by weighted-averaging correlation values between waves that are obtained by shifting reception positions in parallel while taking account of such a point that a phase relation of the waves having the correlativeness becomes different in the reception position. For example, Patent documents 5-8 disclose the space averaging process in the synthetic aperture radar device.

[Patent document 1] Japanese Patent Laid-Open Publication No. 2004-198312

[Patent document 2] Japanese Patent Laid-Open Publication No. 2005-195491

[Patent document 3] Japanese Patent Laid-Open Publication No. 2006-91028

[Patent document 4] Japanese Patent Laid-Open Publication No. 2006-98181

[Patent document 5] Japanese Patent No. 3678946

[Patent document 7] Japanese Patent Laid-Open Publication No. 2001-194454

[Patent document 8] Japanese Patent Laid-Open Publication No. 2002-181930

SUMMARY

Generally, a holographic synthesizing technique is utilized for improving a target detection count. FIG. 1A illustrates how the reception waves are synthesized by the holographic technique. The actually-existing reception antennas are counted six (6) as indicated by ch1-ch6, however, two reception waves fm1, fm2 are, as illustrated in FIG. 1A, synthesized by utilizing a point that a phase of the reception antenna ch6 in phases of the reception waves of the reception antennas ch1-ch6 when, e.g., the reception antenna ch1 is made to function as a transmission antenna, is equal to a phase of the reception antenna ch1 in the phases of the reception waves of the reception antennas ch1-ch6 when the reception antenna ch6 is made to function as the transmission antenna, and reception results of eleven pieces of reception antennas are virtually built up, whereby the target detection count can be improved up to ten (10) target bodies irrespective of the actually-existing antenna count being "6".

According to the holographic synthesizing technique, however, as illustrated in FIG. 1A, the two reception waves fm1, fm2 are detected by sequentially transmitting the transmission waves while switching over the transmission antennas and are synthetically processed, and hence the reception results of the eleven virtual reception antennas are not received simultaneously. Therefore, as illustrated in FIG. 1B, a plurality of targets (T1, T2) exists as detection targets of the radar device, then one target (T2) is moving, in which case phases among the reception waves might shift because the target moves while switching over the transmission antennas, and a possibility is that the holographic synthesizing technique can not be precisely performed.

To be specific, FIG. 1C illustrates a signal intensity (upper stage) and a phase transition (lower stage) according to the holographic synthesizing technique when one of the two targets moves as illustrated in FIG. 1B. In FIG. 1C, the axis of abscissa at each of the upper and lower stages of the graphs corresponds (represents) the antenna number of each of the virtual antennas after the holographic synthesization illustrated in FIG. 1A. As depicted at the lower stage of FIG. 1C, when the two reception waves are synthesized on the premise that the reception waves fm1, fm2 in the virtual antenna #6 has the same phase, then a phase shift occurs while switching over the transmission antenna, and resultantly, as depicted at the upper stage of FIG. 1C, it follows that there is lost a continuity of the transition of the signal intensity of the reception signal after the holographic synthesization. FIG. 1D illustrates the target detection results of the detection carried out based on the reception results depicted in FIG. 1C. FIG. 1D depicts a result of performing an angular spectrum calculation with respect to the reception result described above, in which the axis of abscissa represents a detection angle range of the radar device, and the axis of ordinate represents a spectrum value corresponding to existence of the target. As apparent from FIG. 1D, only two targets exist in the detection angle range of the radar, and nevertheless a multiplicity of unnecessary peaks is calculated, with the result that it is difficult to precisely detect the target.

Note that FIGS. 1E and 1F illustrate, for reference, results of the spectrum calculations with respect to the two reception waves fm1, fm2 before undergoing the holographic synthesization. It is understood from the results thereof that the spectrum peaks indicating the existences of the two targets are exactly calculated. Based on what has been discussed so far, it is obvious that the unnecessary spectrum peak depicted in FIG. 1D is attributed to the holographic synthesizing technique. As a matter of course, in the cases depicted in FIGS. 1E and 1F, though the target can be exactly detected, the holographic synthesizing technique is not conducted, and hence the number of the targets which can be detected at one time is by far smaller than in the case of performing the holographic synthesizing technique (the five targets at the maximum are detectable in the cases illustrated in FIGS. 1E and 1F).

Such being the case, it is an object of the present invention to provide, in view of the problems given above, a radar device capable of detecting a target more exactly even when the target moves at its detection time in a way that keeps more of a target detection count to the greatest possible degree.

The present invention takes, in order to accomplish the object given above, a configuration of applying, to a space averaging process, an antenna switchover technique for transmitting transmission waves in the holographic synthesizing technique. The space averaging process itself is a technique that is generally utilized for restraining correlativeness existing between desired waves and interference waves. Then, the space averaging process in the prior art involves utilizing, as a sub-array, a sub-antenna group extracted as a part of an actually-existing antenna group, and hence it follows that a target detection count depends on the number of reception antennas included in this sub-array. Therefore, in the radar device which executes the space averaging process, it is considered difficult to establish both of an increase in target detection count and accuracy of the detection. The radar device according to the present invention solves the problems about the space averaging process in the prior art by taking the configuration described above.

Specifically, the present invention is a radar device including: a transmission antenna group having a plurality of transmission antennas; a reception antenna group having a plurality of reception antennas; transmission switchover means to transmit transmission waves in a way that sequentially switches over the transmission antennas of the transmission antenna group; virtual correlation value acquiring means to make the reception antenna group which receives reflected waves, reflected from a target, of the transmission waves of the transmission antennas when the transmission switchover means sequentially transmits the transmission waves, function as a virtual sub-array corresponding to the transmission antennas, and to acquire, as a virtual correlation value, a correlation value in a space averaging process which corresponds to the virtual sub-array in a way that corresponds to the number of the transmission antennas from which to transmit the transmission waves; and target detecting means to calculate an average virtual correlation value corresponding to a virtual antenna group that is virtually derived from the reception antenna group through the transmission switchover of the transmission switchover means by executing the space averaging process based on a relative position, to the reception antenna group, of each of the transmission antennas undergoing the transmission switchover of the transmission switchover means with respect to the virtual correlation values, acquired by the virtual correlation value acquiring means, corresponding to the plurality of virtual sub-arrays, and to thus detect the target on the basis of the average virtual correlation value.

In the radar device, when the virtual correlation value acquiring means acquires the virtual correlation value, the plurality of reception antennas included in the reception antenna group is made to function as the virtual sub-arrays. Namely, the radar device according to the present invention treats the whole of the actually-existing reception antenna groups virtually as the sub-arrays in the space averaging process but does not execute a process of extracting a part of the actually-existing reception antenna group by way of the sub-array as in the case of the space averaging process in the prior art. Since a weighted-average process needs executing about the correlativeness between the desired waves and the interference waves in order to apply the space averaging process, the sub-arrays must be moved in parallel so as to overlap the reception positions of the reception antennas forming a proportion of the sub-arrays, however, if the actually-existing reception antenna groups on the whole are set as the virtual sub-arrays as described above, physically the virtual sub-arrays can not be moved in parallel for the space averaging process.

Utilized then is a switchover technique of the transmission antennas for sequentially transmitting the transmission waves, which is conducted in the holographic synthesizing technique. Even when the position of the reception antenna group does not change, the transmission of the transmission waves of the transmission antennas is switched over, whereby the relative position of the transmission antenna to the reception antenna group changes. To describe it in other words, this means that the parallel movement of the sub-array on the occasion of applying the space averaging process can be realized even if the reception antenna group does not actually move. Namely, the change in relative position of the transmission antenna to the reception antenna group, which accompanies the switchover of the transmission through the transmission antenna, implies that the reception antenna group moves relatively in parallel if the transmission antenna is set for the reference, and the space averaging process can be realized if a portion (antennas) of the reception antenna group are overlapped when moved.

This being the case, in the radar device, the virtual correlation value acquiring means acquires, as the transmission switchover means switches over the transmission antennas, the virtual correlation values, corresponding to the transmission antennas from which to transmit the transmission waves, by a transmission antenna count from the reception antenna group that does not actually move in parallel. The virtual correlation value is a value associated with each of the transmission antennas and can be then, as described above, derived and acquired as the correlation value corresponding to the correlation value in the space averaging process from the reception waves received by the reception antenna group that does not actually move in parallel in a way that takes account of the change in relative position of the transmission antenna to the reception antenna group, which accompanies the switchover of the transmission waves of the transmission antennas.

Then, the target detecting means executes the space averaging process with respect to the virtual correlation value acquired by the virtual correlation value acquiring means on the basis of the relative position of the transmission antenna to the associated reception antenna group. Namely, the reception antenna group is deemed to virtually move in parallel due to the change in relative position, which occurs with the sequentially-conducted switchover of the transmission antenna, and the average virtual correlation value defined as a weighted average of the respective virtual correlation values is calculated by executing the space averaging process and is used for detecting the target. The space averaging process such as this in the radar device according to the present invention is hereinafter referred to as a [virtual space averaging process].

Thus, in the radar device, the reception antenna group does not actually move in parallel, and nevertheless it is feasible to obtain the reception result required for the space averaging process through the sub-array that moves in parallel, i.e., the correlation value in the virtual space averaging process by making use of the switchover of the transmission antenna in the transmission switchover means. Therefore, the physical reception antenna groups on the whole can be utilized directly as the virtual sub-arrays, and it is possible to avoid decreasing the target detection count depending on the use of the space averaging process.

Further, the radar device does not, unlike the holographic synthesizing technique in the prior art, synthesize the plurality of reception waves into one reception wave on the basis of the phase of the reception antenna serving as the reference, but switches over the transmission antenna essentially for executing the space averaging process, and hence it is feasible to realize the more exact detection of the target without being affected by a phase shift which occurs with the movement of the target even if the target moves when switching over the transmission antenna as described above.

Herein, in the radar device, the transmission antenna group may be embraced by the reception antenna group, and the transmission switchover means may sequentially make a part or the whole of the reception antennas included in the reception antenna group function as transmission antennas. With this configuration, a part of the reception antenna group serves also as the transmission antenna, whereby the radar device can be made compact. On the other hand, in the radar device, the transmission antenna group and the reception antenna group may be each configured separately. This configuration facilitates formation of the transmission antenna suited to a transmission purpose of the transmission waves such as transmitting, e.g., much stronger transmission waves. Therefore, an interval between the transmission antennas of the transmission antenna group may be different from an interval between the reception antennas of the reception antenna group.

In the radar device described so far, the target detecting means may calculate an average virtual correlation value, may make the plurality of reception antennas included in the virtual sub-arrays function as a plurality of secondary virtual sub-arrays of which portions are overlapped with each other, may acquire, as secondary virtual correlation values, the correlation values corresponding to the secondary virtual sub-arrays in the space averaging process in a way that corresponds to the number of the plurality of secondary virtual sub-arrays, may calculate an average secondary virtual correlation value by executing the space averaging process with respect to the secondary virtual correlation values, and may detect the target on the basis of the average virtual correlation value and the average secondary virtual correlation. Namely, as described above, the additional space averaging process is executed by conducting the space averaging process using the virtual correlation values and by utilizing the secondary virtual correlation values of the secondary virtual sub-arrays extracted as a part of the reception antenna groups which are included in the virtual sub-arrays. The multiple execution of the virtual space averaging process enables the effect of the space averaging process to be further enjoyed, whereby the more exact detection of the target can be realized. It should be noted that the target detection count by the radar device in this case depends, it follows, on the number of the reception antennas included in the secondary virtual sub-arrays.

In the radar device, the radar device can detect the target more exactly even when the target moves at its detection time in a way that keeps more of the target detection count to the greatest possible degree.

BRIEF DESCRIPTION OF THE DRAWINGS

FIG. 3A is a first diagram illustrating a principle of a virtual space averaging process executed in the radar device according to the present invention;

FIG. 3B is a diagram illustrating a principle of the space averaging process executed by way of the prior art in a conventional radar device;

FIG. 4 is a flowchart illustrating a flow f the virtual space averaging process executed in the radar device according to the present invention;

FIG. 5B is a diagram illustrating a result of the angular spectrum calculation for detecting the target taking the motion illustrated in FIG. 4A and a result of specifying the target in an FOV (Field Of View) in the radar device according to the present invention;

FIG. 5C is a diagram illustrating a result of the angular spectrum calculation for detecting the target taking the motion illustrated in FIG. 4A and a result of specifying the target in the FOV in the conventional radar device;

FIG. 6 is a second diagram illustrating the principle of the virtual space averaging process executed in the radar device according to the present invention.

DESCRIPTION OF EMBODIMENTS

Figure 1A:
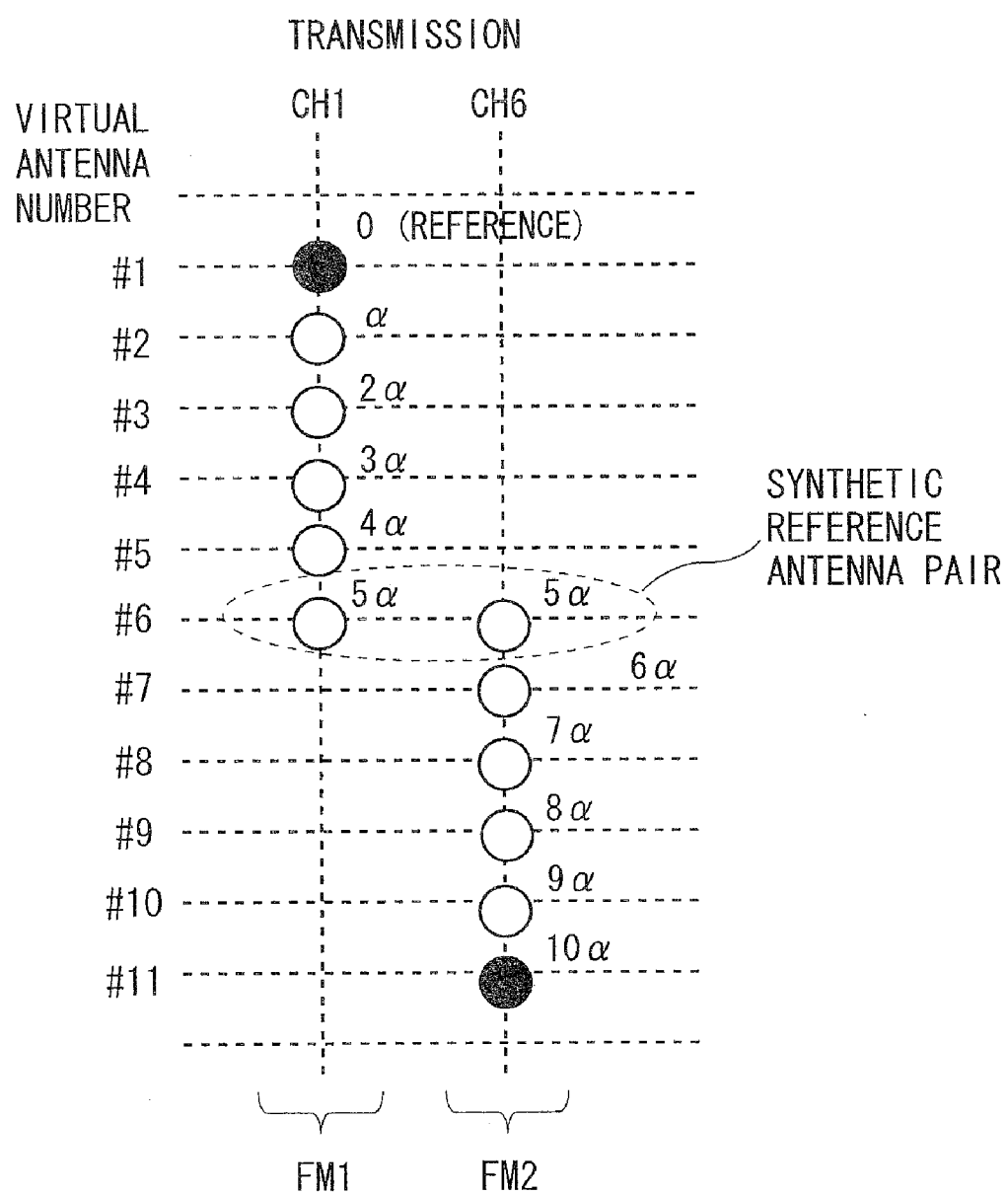
FIG. 1A is a diagram illustrating an outline of a holographic synthesizing technique.
Figure 1B:
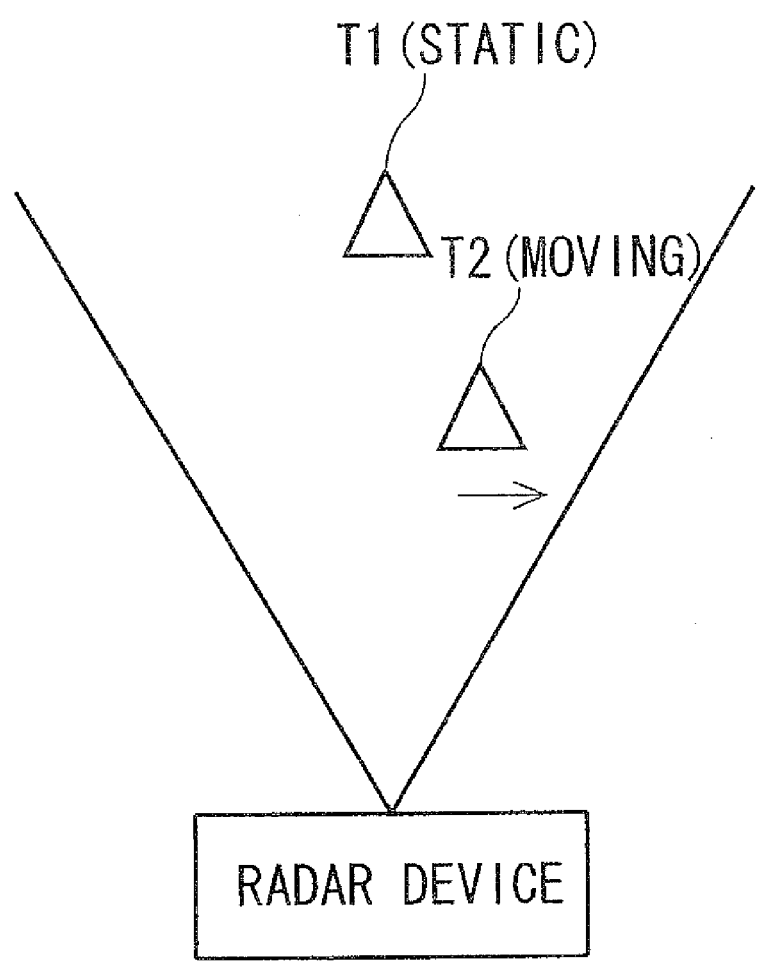
FIG. 1B is a diagram illustrating a motion of a target defined as a detection object in a radar device using the holographic synthesizing technique.
Figure 1C:
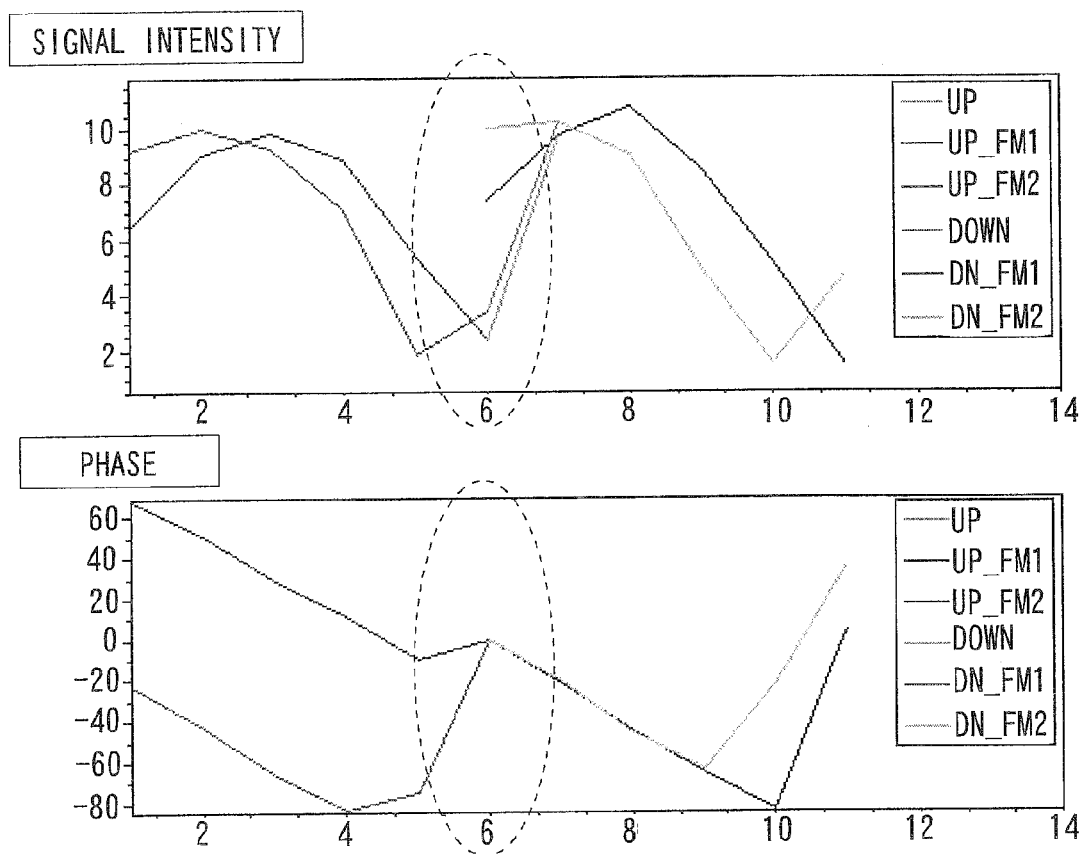
FIG. 1C is a diagram illustrating a signal intensity and a transition of a signal phase when synthesizing two reception wave signals by the holographic synthesizing technique on such an occasion that the target moves in the radar device illustrated in FIG. 1B.
Figure 1D:
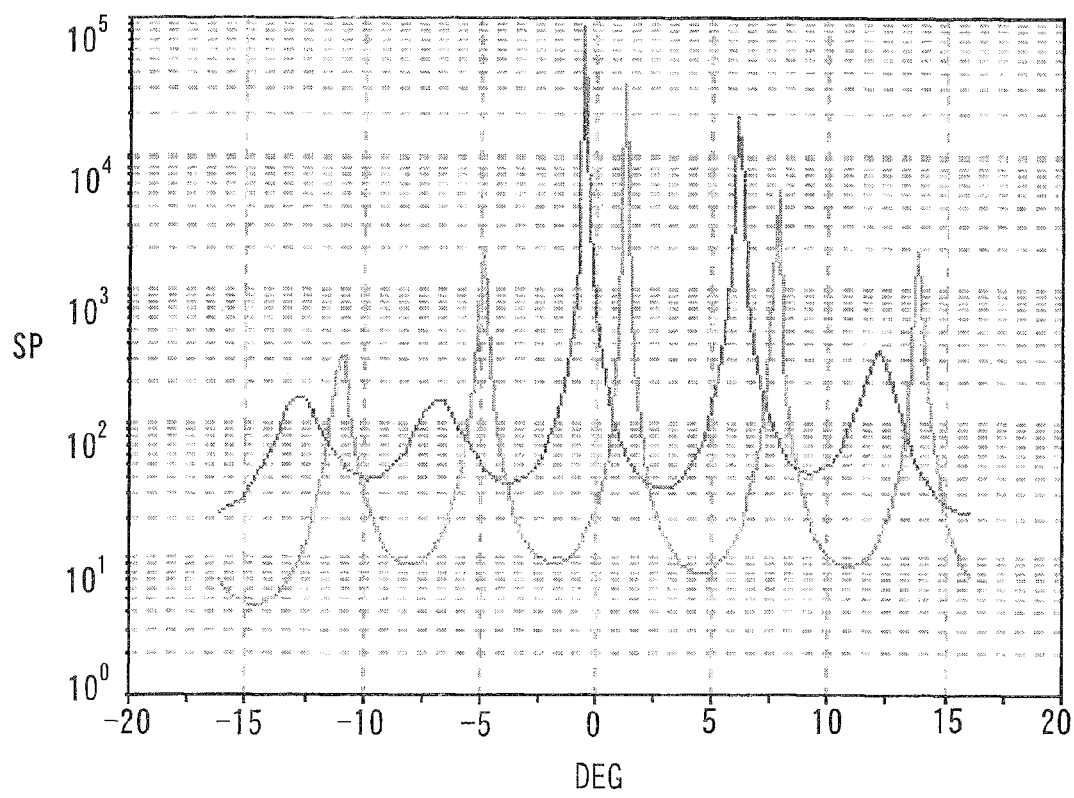
FIG. 1D is a diagram illustrating a result of an angular spectrum calculation for detecting the target on the basis of the synthesized reception signal depicted in FIG. 1C.
Figure 1E:
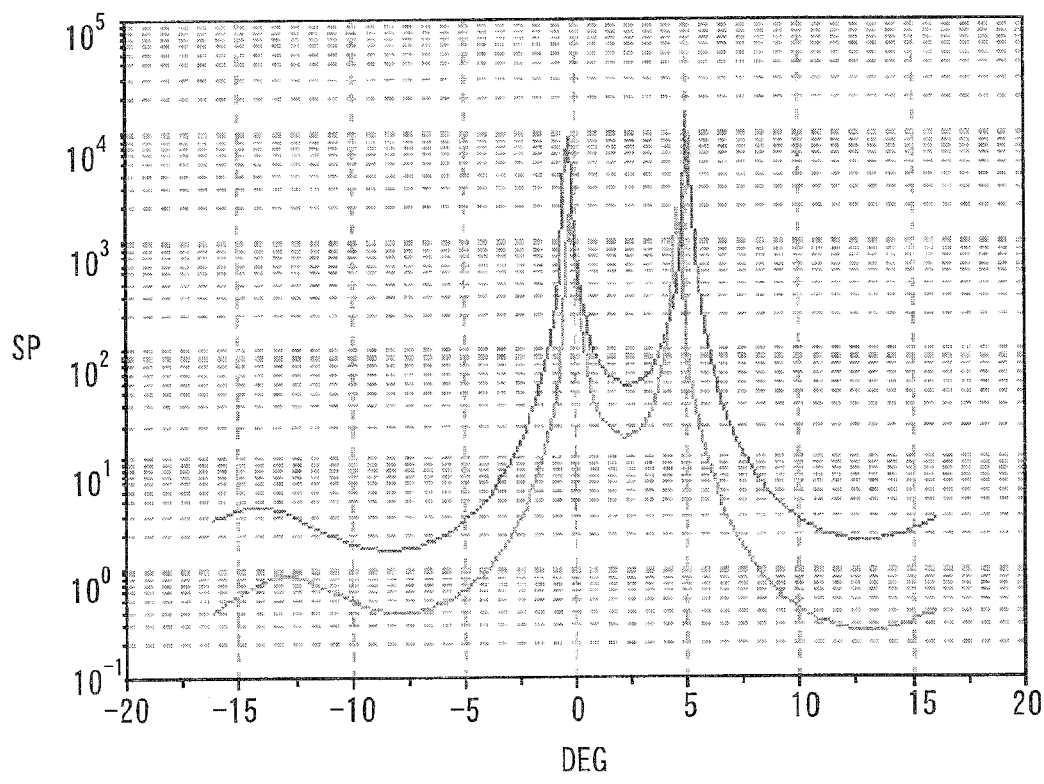
FIG. 1E is a first diagram illustrating the result of the angular spectrum calculation in the case of detecting the target without using the holographic synthesizing technique in the radar device illustrated in FIG. 1B.
Figure 1F:
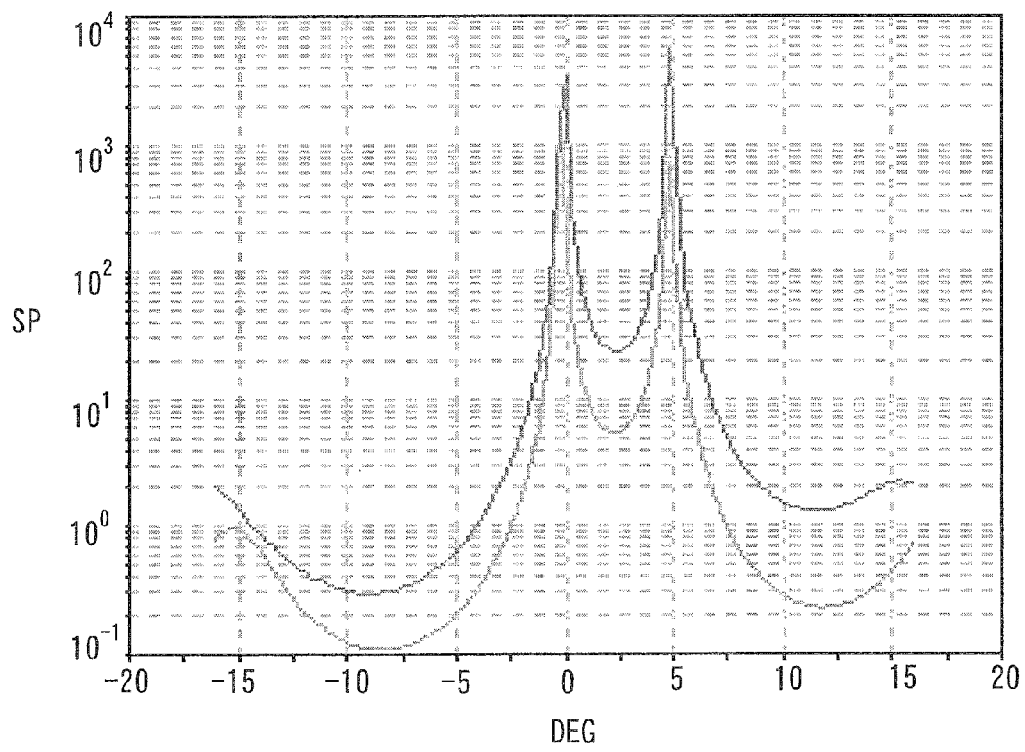
FIG. 1F is a second diagram illustrating the result of the angular spectrum calculation in the case of detecting the target without using the holographic synthesizing technique in the radar device illustrated in FIG. 1B.

An embodiment of a radar device according to the present invention will hereinafter be described with reference to the drawings. The radar device according to the embodiment is mounted on a vehicle and thus can be used for detecting a vehicle-ambient target such as another vehicle. A result of detecting the target is output to an on-vehicle storage device, an on-vehicle ECU (Electrical Control Unit), etc and can be used for controlling the vehicle. The radar device according to the embodiment may also be employed for applications other than the on-vehicle radar device.

First Working Example

FIG. 1 is a diagram illustrating an outline of a configuration of a radar device 1 according to the embodiment. The radar device 1 according to the embodiment includes antennas ch1-ch6 disposed at equal antenna intervals d, a distributor 19, a transmitting unit 11, a receiving unit 12, a preprocessing unit 14, a detecting unit 15 and an output unit 16, in which a control unit 13 of the radar device 1 is built up by the preprocessing unit 14, the detecting unit 15 and the output unit 16. The control unit 13 can be realized by, e.g., a computer, in which general-purpose or dedicated processors can be used for configuring the preprocessing unit 14, the detecting unit 15 and the output unit 16. Further, a combination of the plural processors may be included by one configuration, and one single processor having multiple functions in the plurality of configurations may also be employed.

The transmitting unit 11 controls switchover of a transmitting/receiving status of each antenna in order to transmit radar transmission waves by using any one of the antennas ch1-ch6 as a transmission antenna. In the radar device 1 according to the embodiment, any antennas ch1-ch6 can be used for the transmission, however, on the occasion of embodying the radar device 1 according to the present invention, it may be sufficient that at least two or more antennas in the plurality of antennas in an array antenna are usable as the transmission antennas. Further, the first working example involves using radar transmission waves of an FM-CW (Frequency Modulated Continuous Wave) method by way of radio waves transmitted and received by the radar device 1. The FM-CW method can acquire, from reflected radio waves, Doppler shift according to a relative phase based on an angle of the target, a time delay based on a distance of the target and a speed of the target, and hence the angle, the distance and the relative speed of the target can be measured.

The receiving unit 12 receives the reflected radio waves from the target by using, as reception antennas, the antennas that are not in the process of transmitting the radar transmission waves in the antennas ch1-ch6. In the radar device 1 according to the embodiment, it is possible to receive the reflected radio waves of the radar transmission waves transmitted by the self-antenna by switching over the transmission antenna to the reception antenna on a time-division basis immediately after transmitting the radar transmission waves from the transmission antenna. For example, in the case of using the antenna ch1 as the transmission antenna, the antenna ch1 is switched over to a reception mode immediately after transmitting the radar transmission waves from the antenna ch1, whereby the antenna ch1 is also made to receive the reflected radio waves of the radar transmission waves transmitted from the antenna ch1. Namely, in the first working example, it follows that all of the six antennas ch1-ch6 are employed as the reception antennas also in the case of using each antenna as the transmission antenna. Further, a specific configuration of the receiving unit is that a dedicated receiving circuit may be provided on a per-antenna basis, however, the receiving circuit for receiving batchwise the reception signals of all of the reception antennas may also be provided. The latter case entails controlling sequential switchover of the reception antenna to which the receiving circuit corresponds on the time-division basis but can make compact the circuit configuration in the radar device 1.

The first working example realizes the preprocessing unit 14, the detecting unit 15 and the output unit 16 in such a way that the computer serving as the control unit 13 executes a control program. The control unit 13 employed herein is the computer including a RAM (Random Access Memory), a ROM (Read Only Memory), a CPU (Central Processing Unit) which controls the whole system by processing instructions and data deployed on the RAM etc, an EEPROM (Electrically Erasable and Programmable ROM) stored with a variety of programs loaded into the RAM, various items of data used by the system such as calculated results acquired in a target detecting process, and so on.

The control unit 13 controls the respective components provided in the radar device 1. Specifically, the control unit 13 controls the distributor 19 in a way that synchronizes with transmission timing of the radar transmission waves and reception timing of the reflected radio waves from the target, thereby switching over the transmission/reception modes of each antenna. In the first working example, the transmission antenna is switched over to the transmission mode and the reception mode at a high speed on the time-division basis and thus receives the reflected radio waves of the radar transmission waves transmitted by the self-antenna.

The preprocessing unit 14 executes a virtual space averaging process according to the present invention, thereby restraining a correlation between a desired wave and an interference wave through a so-called space averaging process and enabling avoidance of a decrease in target detection count due to the space averaging process. An in-depth description of the operation of the preprocessing unit 14 will be made later on.

The detecting unit 15 calculates the angle, the distance and the speed of the target on the basis of the reception signals undergoing the virtual space averaging process. Further, the output unit 16 establishes the target detection results (the information containing the angle, the distance and the speed of the target) of the detecting unit 15, and the established detection results are output to the ECU etc connected to the radar device 1. In the first working example, the output unit 16 outputs the target detection results with high accuracy, and hence the on-vehicle ECU can control an engine, an on-vehicle navigation system, etc on the basis of the target detection results with the high accuracy.

Herein, a principle of the virtual space averaging process executed by the preprocessing unit 14 of the radar device 1 will hereinafter be described with reference to FIG. 3A. Note that the virtual space averaging process is, similarly to the conventional space averaging process, the preprocessing of the target detection for exactly detecting the target by restraining the correlation between the desired wave and the interference wave on the occasion of detecting the target. The virtual space averaging process is, however, largely different from the prior arts in terms of a mode of detecting the reception signal based on a sub-array for executing the space averaging process and therefore embodies excellent target detecting performance that is not inherent in the prior arts.

Figure 2:
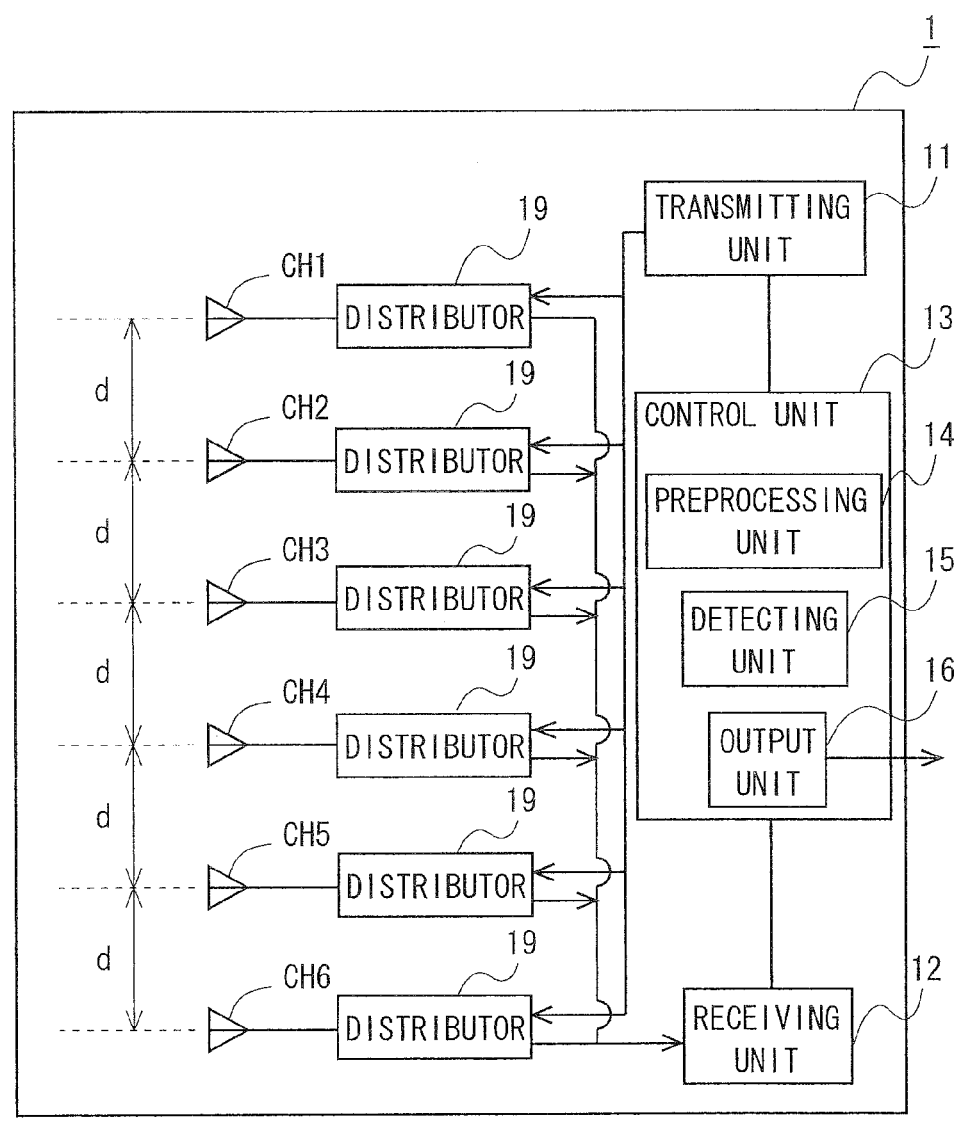
FIG. 2 is a diagram illustrating an outline of a configuration of the radar device according to the present invention.

As illustrated in FIG. 2, in the radar device 1 which executes the virtual space averaging process, the six physically-existing antennas ch1-ch6 function as the transmission antennas and the reception antennas. Accordingly, in the radar device 1, the antennas ch1-ch6 correspond to a reception antenna group and a transmission antenna group as well according to the present invention. Herein, each of the antennas illustrated in FIG. 3A is marked with an antenna number combined with a symbol [#]. The antenna number with the symbol [#] corresponds to a virtual antenna different from the actually existing antenna.

Herein, when the virtual space averaging process executed by the radar device 1 is conducted and when the antenna ch1 functions as the transmission antenna, the antennas ch1-ch6 function as the reception antennas. Accordingly, it follows that the antenna ch1 functions as the transmission/reception antenna. The reception signals received by the reception antenna group at that time correspond to the transmission waves from the antenna ch1 and are referred to as first reception signals. Similarly, the reception signals received by the reception antenna group when the antenna ch2 functions as the transmission antenna are termed second reception signals; the reception signals received by the reception antenna group when the antenna ch3 functions as the transmission antenna are referred to as third reception signals; and the reception signals received by the reception antenna group when the antenna ch4 functions as the transmission antenna are termed fourth reception signals.

To examine the reception signals (the first reception signals through the fourth reception signals) received by the reception antenna groups when the antennas ch1 through ch4 are thus sequentially switched over to the transmission antennas, the respective reception signals are received by the same reception antenna group, i.e., the actually-existing reception antennas ch1-ch6, however, supposing that the signals are, if viewed otherwise, transmitted from the same transmission antenna(s) in a way that superposes the positions of the transmission antennas at one place, the respective reception signals are equivalent to the signals received by the virtual reception antenna group moved at a moving distance when the positions shift upon sequentially switching over the transmission antennas. Namely, even in such a case that the reception antenna group does not move, it is possible to virtually configure a mechanism of receiving the reflected waves from the target as if by moving the reception antenna group through the sequential switchover of the transmission antennas. Such being the case, the virtual space averaging process according to the present invention involves executing the space averaging process by making use of the movement of the virtual reception antenna group.

Then, in the virtual space averaging process described above, as illustrated in FIG. 3A, the reception antenna group can be virtually treated as the antennas that sequentially move at a switchover moving distance d (taking the same value as the intervals d between the respective antennas) of the transmission antennas, corresponding to the switchover of the transmission antennas. Then, the reception antenna group treated as the virtually-moved antennas is referred to as a virtual sub-array, and each virtual sub-array is attached with, as reference numbers, the numbers of the transmission antennas from which to transmit the transmission waves. For instance, the virtual reception antenna group receiving the first reception signals if the antenna ch1 functions as the transmission antenna is referred to as a sub-array 1, and the virtual reception antenna group receiving the fourth reception signals if the antenna ch4 functions as the transmission antenna is termed a sub-array 4 (see FIG. 3A). In this case, the virtual sub-array 2 is located in a position shifted at the distance d from the virtual sub-array 1, and the five antennas of the virtual sub-array 2 are overlapped with the five antennas of the virtual sub-array 1 in their arrangements in the positions of the virtual antennas #2-#6. Further, one remaining antenna of the virtual sub-array 2 becomes a virtual seventh ($7^{th}$) antenna #7. The configuration is the same with the virtual sub-arrays 3, 4, as a result of which the respective virtual sub-arrays move at the distance d, and the sub-arrays adjacent to each other come to have a relation in which the antennas partially included therein are overlapped with each other. Moreover, the sixth ($6^{th}$) antenna of the virtual sub-array 1 becomes the virtual reception antenna #6; the sixth ($6^{th}$) antenna of the virtual sub-array 2 becomes the virtual reception antenna #7; the sixth ($6^{th}$) antenna of the virtual sub-array 3 becomes the virtual reception antenna #8; and the sixth ($6^{th}$) antenna of the virtual sub-array 4 becomes the virtual reception antenna #9.

When based on what has been discussed so far, in the virtual space averaging process, only the six antennas ch1-ch6 actually exist in the radar device 1, and nevertheless the six antennas forming a proportion of the nine virtual antennas #1-#9 can be utilized as the virtual sub-array for the space averaging process. In other words, the virtual space averaging process enables the space averaging process to be attained in a status of utilizing all of the reception antennas included in the actually-existing reception antenna group. Therefore, the target detection count of the radar device 1 depends on the number of the reception antennas included in the virtual sub-array, i.e., the number of the actually-existing reception antennas, and it is feasible to avoid decreasing the target detection count while executing the space averaging process. The prior art requires at least, as illustrated in FIG. 3B, the nine reception antennas actually included in the reception antenna group in order to realize the space averaging process equal to the process in FIG. 3A, and it follows that the six actually-existing antennas are extracted from within these nine antennas as the sub-array for the space averaging process. Hence, as compared with the radar device according to the present invention which executes the virtual space averaging process illustrated in FIG. 3A, physically a large number of reception antennas are needed, and there is a tendency of hindering the radar device from becoming compact.

Further, in the case of conducting the space averaging process, as the moving range of the sub-array gets broader, the effect of restraining the correlation between the desired wave and the interference wave due to this process can be made more conspicuous. Such being the case, the radar device 1 according to the present invention can further increase the virtual sub-arrays (the virtual sub-arrays to be increased are depicted by dotted lines in FIG. 3A) by the sequential transmissions from the antennas ch5, ch6 as illustrated in FIG. 3A. It is therefore feasible to enjoy more effectively the effect of the space averaging process without upsizing the radar device 1.

Thus, the radar device 1 according to the present invention switches over the transmission antenna for executing the virtual space averaging process. Then, FIG. 4 illustrates a flow of the virtual space averaging process executed in the radar device 1 and a flow of the specific target detecting process based on this virtual space averaging process. The target detecting process illustrated in FIG. 4 is, after starting up the radar device 1, carried out by the control unit 13 which executes the control program, and especially the virtual space averaging process is executed by the preprocessing unit 14. Note that the process start timing may follow a target detection request according to the computer and the ECU connected to the outside of the radar device 1. Further, the processing sequences illustrated in the respective drawings are each one example and may also be properly rearranged corresponding to the embodiment.

In S101, as illustrated in FIG. 3A, the signals are received by the virtual sub-arrays in a way that sequentially switches over the transmission antennas. Namely, as described above, the actually-existing reception antenna group does not move, and nevertheless, by virtue of a deviation in relative position between the transmission antenna group and the reception antenna group upon the switchover of the transmission antennas, a reception status of the virtual sub-array occurs by virtually generating a state in which the reception antenna group moves. In the first working example, following FIG. 3A, the antennas ch1-ch4 are sequentially made to function as the transmission antennas, thereby acquiring the reception results of the virtual sub-arrays 1-4. Note that the reception signal of the virtual sub-array is simply referred to as a virtual sub-array signal. When finishing the process in S101, the operation proceeds to S102.

In S102, a virtual correlation value per virtual sub-array, which corresponds to the correlation value in the conventional space averaging process, is acquired based on each virtual sub-array signal obtained in S101. The "virtual correlation value" is a correlation value in the virtual space averaging process according to the embodiment and is physically homogeneous to the correlation value in the conventional space averaging process, and hence a specific calculation thereof is restricted to a brief description. Namely, the calculation in S102 involves calculating the correlation value for the space averaging process on the basis of the reception signals received by the virtual sub-array deemed to virtually exist owing to the switchover of the transmission antennas.

Specifically, an input vector Xn(t) of a virtual sub-array n is expressed by the following formula.

$$X_n(t)=[x_n(t), x_{n+1}(t), \ldots, x_{n+5}(t)]^T (n=1, 2, 3, 4)$$

Therefore, a correlation matrix defined as the virtual correlation values of the virtual sub-array n is expressed by the following formula.

$$R_{xx}{}^n = E[X_n(t)X_n{}^H(t)] (n=1, 2, 3, 4) \quad \text{[Mathematical Expression 1]}$$

Upon finishing the process in S102, the operation proceeds to S103.

In S103, with respect to the virtual correlation value calculated in S102 per virtual sub-array, the space averaging process is executed based on the relative positions between the sequentially-switched-over transmission antennas and the reception antenna group, i.e., based on being the status in which each virtual sub-array moves for every switchover of the transmission antenna as illustrated in FIG. 3A, thus scheming to restrain the correlation between the desired wave and the interference wave. The space averaging process itself for restraining the correlation, which is executed in S103, is substantially the same as the conventional space averaging process, and hence its description is omitted. Upon finishing the process in S103, the operation proceeds to S104.

In S104, the detecting unit 15 calculates the target angle on the basis of the result of the virtual space averaging process executed in S101-S103. Note that a technique of calculating the target angle on the basis of the relative phase of the reflected radio waves received by the array antennas belongs to the conventional technology, and therefore its in-depth description is omitted. Further, the radar device 1 according to the first working example transmits the radar transmission waves by the FM-CW method, and it is therefore feasible to calculate also the distance and the speed of the target from the time delay of the reception radio waves due to the distance of the target and the Doppler shift of the reception radio waves due to the speed of the target. The output unit 16 outputs the target detection result obtained in S104 to the ECU etc connected to the radar device 1. Thereafter, the processes in S101 through S105 are repeated, whereby the radar device 1 according to the first working example periodically detects the target and outputs the detection results to the ECU etc.

Figure 5A:
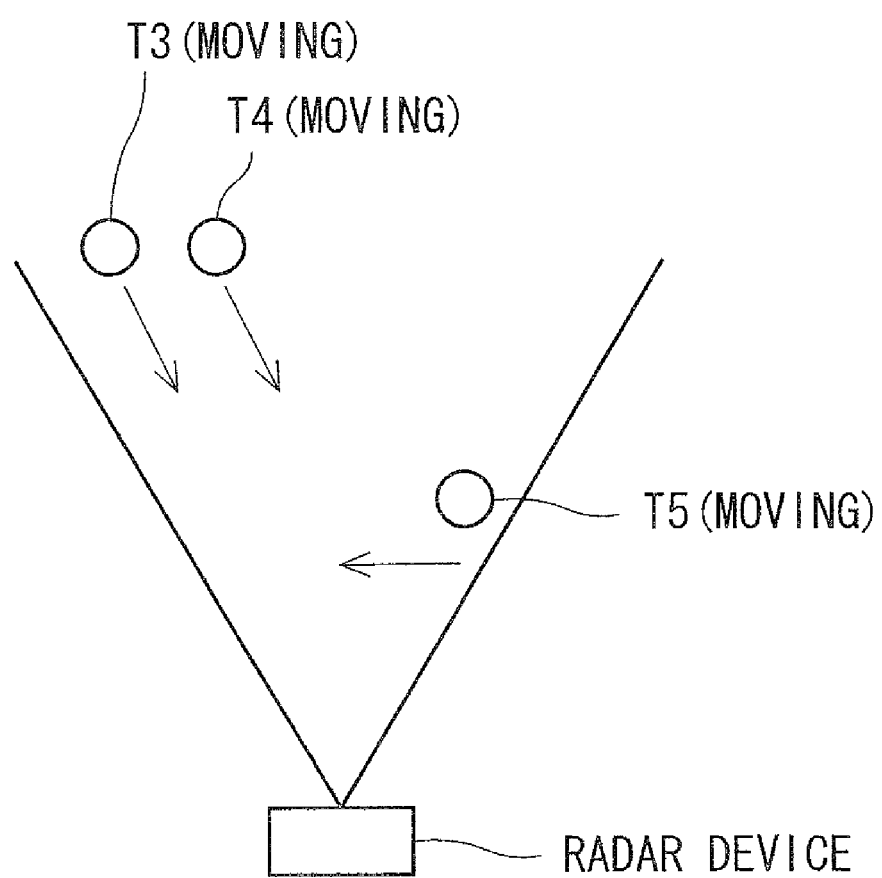
FIG. 5A is a diagram illustrating a motion of the target defined as the detection object in the radar device according to the present invention.

The target detection result under the target detection control will hereinafter be described with reference to FIGS. 5A-5C. As illustrated in FIG. 5A, an assumption is that three target bodies (T3, T4, T5) exist in an FOV (Field Of View), one body (T5) among those bodies moves on the left side from the right side, and the remaining two bodies (T3, T4) move closer to the near side (the side of the radar device) from the depth on the left side. FIG. 5B illustrates the detection results when executing the target detection process illustrated in FIG. 4 with respect to the target making those motions. A calculation result of the angular spectrum is given on the left side in FIG. 5B, and a calculation result of the target position based on the former calculation result is given on the right side. Thus, it is understood that the motions of the three target bodies are exactly detected.

Further, FIG. 5C illustrates a target detection result on such an occasion that the radar device 1 carries out a conventional holographic synthesizing technique illustrated for reference in FIG. 1A. In this case, the target is detected based on a result of synthesizing two reception waves fm1, fm2 obtained by transmitting the transmission waves from the antennas ch1 and ch6. As obvious from FIG. 5C, the three target bodies are not exactly detected. In particular, the detection result of the target T5 moving across the FOV is extremely unclear. This is because according to the holographic technique, though the phase of the reception waves is a significant factor, a large deviation, it is considered, occurs in the phase of the reception waves during the switchover of the transmission antenna with respect to the motion across the FOV as the target T5 does.

With the operation described above, the radar device 1 according to the present invention executes the virtual space averaging process, thereby enabling the more exact detection of the target to be realized without reducing the target detection count depending on the number of the actually-existing reception antennas.

Second Working Example

Another working example of the virtual space averaging process executed by the radar device 1 according to the present invention will hereinafter be described with reference to FIG. 6. In a mode of the virtual space averaging process illustrated in FIG. 6, to start with, the virtual space averaging process according to the first working example illustrated in FIG. 3A is executed. In the second working example, however, the virtual sub-arrays to be configured for sequentially making the antennas ch1, ch3, ch5, ch6 function as the transmission antennas are the four virtual sub-arrays 1, 3, 5, 6. Accordingly, the virtual space averaging process according to the second working example involves executing the virtual space averaging process given in the first working example, in which the six antennas forming a proportion of the virtual reception antennas #1-#11 are used as the virtual sub-arrays.

Moreover, in the second working example, in the respective virtual sub-arrays, an additional virtual space averaging process is executed within the virtual sub-arrays in a way that extracts some of the virtual antennas included in the virtual sub-arrays as the further sub-arrays. The "further sub-arrays" are referred to as secondary virtual sub-arrays. For example, as illustrated in FIG. 6, in the virtual sub-array 1, a secondary virtual sub-array 1 configured by the virtual antennas #1-#5 and a secondary virtual sub-array 2 configured by the virtual antennas #2-#6 are extracted, and the virtual space averaging process is carried out by use of these secondary virtual sub-arrays and is also executed likewise in the virtual sub-arrays 3, 5, 6.

Thus, the virtual space averaging process is additionally executed within the virtual sub-array, whereby the restraint of the correlation between the desired wave and the interference wave can be actualized more effectively. The target detection count by the radar device 1 depends on the number of the virtual reception antennas included in the secondary virtual sub-array, and hence, in the case of the second working example, it follows that the target detection count decreases as compared with the first working example. Incidentally, the additional virtual space averaging process may be further executed within the secondary virtual sub-array as the necessity arises.

Third Working Example

Figure 7:
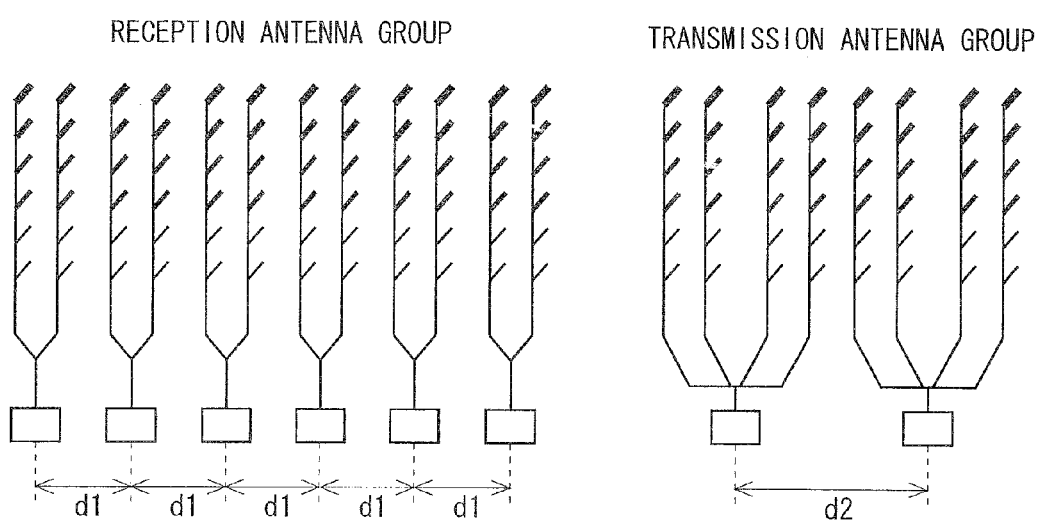
FIG. 7 is a diagram illustrating another arrangement mode of the transmission/reception antennas in the radar device according to the present invention.

Still another working example of the radar device 1 according to the present invention will hereinafter be described with reference to FIG. 7. The antennas in the radar device 1 illustrated in FIG. 1 have the configuration that a part or the whole of the reception antenna group functions also as the transmission antennas. Herein, as illustrated in FIG. 7, the reception antenna group and the transmission antenna group may take different configurations. The virtual space averaging process is executed based on the relation of the relative position between the transmission antenna group and the reception antenna group, and, if the virtual reception antenna groups deemed to virtually move have the partially-overlapped portions (antennas) when sequentially switching over the transmission antennas, it is possible to function as the virtual sub-array described above. At this time, it is preferable for effectively realizing the virtual space averaging process that an interval d1 between the reception antennas is the same as an interval d2 between the transmission antennas, however, even if these intervals are different from each other, the restraint of (the correlation between) the desired wave and the interference wave can, it is considered, be realized by properly executing the virtual space averaging process based on the virtual correlation value. On the other hand, the interval between the transmission antennas is set in the form of not being constrained by the interval between the reception antennas, thereby facilitating the formation of the transmission wave antennas adapted to the transmission purpose of the transmission waves such as transmitting much stronger transmission waves.

What is claimed is:

1. A radar device comprising:
   a transmission antenna group having a plurality of transmission antennas;
   a reception antenna group having a plurality of reception antennas;
   transmission switchover means to transmit transmission waves in a way that sequentially switches over said transmission antennas of said transmission antenna group;
   virtual correlation value acquiring means to make said reception antenna group which receives reflected waves, reflected from a target, of the transmission waves of said transmission antennas when said transmission switchover means sequentially transmits the transmission waves, function as a virtual sub-array corresponding to said transmission antennas, and to acquire, as a virtual correlation value, a correlation value in a space averaging process which corresponds to said virtual sub-array in a way that corresponds to the number of said transmission antennas from which to transmit the transmission waves; and
   target detecting means to calculate an average virtual correlation value corresponding to a virtual antenna group that is virtually derived from said reception antenna group through the transmission switchover of said transmission switchover means by executing the space averaging process based on a relative position, to said reception antenna group, of each of said transmission antennas undergoing the transmission switchover of said transmission switchover means with respect to the virtual correlation values, acquired by said virtual correlation value acquiring means, corresponding to said plurality of virtual sub-arrays, and to thus detect the target on the basis of the average virtual correlation value.

2. The radar device according to claim 1, wherein said transmission antenna group is embraced by said reception antenna group, and
   said transmission switchover means sequentially makes a part or the whole of said reception antennas included in said reception antenna group function as transmission antennas.

3. The radar device according to claim 1, wherein said transmission antenna group and said reception antenna group are each configured separately.

4. The radar device according to claim 3, wherein an interval between said transmission antennas of said transmission antenna group is different from an interval between said reception antennas of said reception antenna group.

5. The radar device according to any one of claim 1, wherein said target detecting means calculates an average virtual correlation value, makes said plurality of reception antennas included in said virtual sub-arrays function as a plurality of secondary virtual sub-arrays of which portions are overlapped with each other, acquires, as secondary virtual correlation values, the correlation values corresponding to said secondary virtual sub-arrays in the space averaging process in a way that corresponds to the number of said plurality of secondary virtual sub-arrays, calculates an average secondary virtual correlation value by executing the space averaging process with respect to the secondary virtual correlation values, and detects the target on the basis of the average virtual correlation value and the average secondary virtual correlation.

6. The radar device according to any one of claim 2, wherein said target detecting means calculates an average virtual correlation value, makes said plurality of reception antennas included in said virtual sub-arrays function as a plurality of secondary virtual sub-arrays of which portions are overlapped with each other, acquires, as secondary virtual correlation values, the correlation values corresponding to said secondary virtual sub-arrays in the space averaging process in a way that corresponds to the number of said plurality of secondary virtual sub-arrays, calculates an average secondary virtual correlation value by executing the space averaging process with respect to the secondary virtual correlation values, and detects the target on the basis of the average virtual correlation value and the average secondary virtual correlation.

7. The radar device according to any one of claim 3, wherein said target detecting means calculates an average virtual correlation value, makes said plurality of reception antennas included in said virtual sub-arrays function as a plurality of secondary virtual sub-arrays of which portions are overlapped with each other, acquires, as secondary virtual correlation values, the correlation values corresponding to said secondary virtual sub-arrays in the space averaging process in a way that corresponds to the number of said plurality of secondary virtual sub-arrays, calculates an average secondary virtual correlation value by executing the space averaging process with respect to the secondary virtual correlation values, and detects the target on the basis of the average virtual correlation value and the average secondary virtual correlation.

8. The radar device according to any one of claim 4, wherein said target detecting means calculates an average virtual correlation value, makes said plurality of reception antennas included in said virtual sub-arrays function as a plurality of secondary virtual sub-arrays of which portions are overlapped with each other, acquires, as secondary virtual correlation values, the correlation values corresponding to said secondary virtual sub-arrays in the space averaging process in a way that corresponds to the number of said plurality of secondary virtual sub-arrays, calculates an average secondary virtual correlation value by executing the space averaging process with respect to the secondary virtual correlation values, and detects the target on the basis of the average virtual correlation value and the average secondary virtual correlation.

* * * * *